US006898076B2

(12) United States Patent
Pappalardo et al.

(10) Patent No.: US 6,898,076 B2
(45) Date of Patent: May 24, 2005

(54) MODULAR INFORMATION PROCESSING SYSTEM

(75) Inventors: Francesco Pappalardo, Paterno (IT); Luigi Mantellassi, Ornex (FR)

(73) Assignee: STMicroelectronics S.r.l., Agrate Brianza (IT)

( * ) Notice: Subject to any disclaimer, the term of this patent is extended or adjusted under 35 U.S.C. 154(b) by 62 days.

(21) Appl. No.: 10/242,296

(22) Filed: Sep. 12, 2002

(65) Prior Publication Data

US 2003/0067744 A1 Apr. 10, 2003

(30) Foreign Application Priority Data

Sep. 13, 2001 (EP) .............................................. 01830581

(51) Int. Cl.[7] .................................................. G06F 1/16
(52) U.S. Cl. ....................... 361/683; 361/681; 361/686; 710/303; 710/304
(58) Field of Search ................................ 361/683, 686, 361/679, 685, 726, 727; 439/607, 928; 312/223.2; 710/100, 300, 107, 302, 306, 307, 68, 72, 303, 304, 31, 51, 101; 713/300, 310, 323, 330; 708/141, 145, 518; 345/1, 173, 903, 158

(56) References Cited

U.S. PATENT DOCUMENTS

| 4,530,069 | A | * | 7/1985 | Desrochers ..................... 710/2 |
| 5,278,730 | A | * | 1/1994 | Kikinis ........................ 361/686 |
| 5,579,489 | A | * | 11/1996 | Dornier et al. ................. 710/303 |
| 5,600,800 | A | * | 2/1997 | Kikinis et al. ................. 710/303 |
| 5,608,608 | A | * | 3/1997 | Flint et al. .................... 361/686 |
| 5,675,524 | A | * | 10/1997 | Bernard ....................... 708/109 |
| 6,047,572 | A | | 4/2000 | Biven et al. |
| 6,070,205 | A | * | 5/2000 | Kato et al. .................... 710/100 |
| 6,072,401 | A | * | 6/2000 | Kumar ..................... 340/825.25 |
| 6,169,655 | B1 | | 1/2001 | Helot |
| 6,286,060 | B1 | * | 9/2001 | DiGiorgio et al. ............ 710/31 |
| 6,353,870 | B1 | * | 3/2002 | Mills et al. ................... 710/301 |
| 6,407,914 | B1 | * | 6/2002 | Helot .......................... 361/686 |
| 6,438,622 | B1 | * | 8/2002 | Haghighi et al. ............... 710/1 |
| 6,516,374 | B1 | * | 2/2003 | Kinoshita et al. ........... 710/304 |
| 6,525,932 | B1 | * | 2/2003 | Ohnishi et al. .............. 361/686 |
| 6,636,918 | B1 | * | 10/2003 | Aguilar et al. ............... 710/303 |
| 6,654,826 | B1 | * | 11/2003 | Cho et al. ..................... 710/62 |
| 6,658,508 | B1 | * | 12/2003 | Reiss et al. .................. 710/100 |
| 6,765,789 | B2 | * | 7/2004 | Yang ........................... 361/681 |
| 2002/0194468 | A1 | * | 12/2002 | Betts-LaCroix et al. ..... 713/100 |

FOREIGN PATENT DOCUMENTS

EP 0 795 810 9/1997

OTHER PUBLICATIONS

European Search Report dated Mar. 22, 2002 for European Application No. 01830581.

* cited by examiner

Primary Examiner—Michael Datskovsky
(74) Attorney, Agent, or Firm—Lisa K. Jorgenson; Stephen Bongini; Fleit, Kain, Gibbons, Gutman, Bongini & Bianco P.L.

(57) ABSTRACT

A modular information processing system is disclosed. The system includes an expansion device that embeds at least one internal peripheral without a controller and/or at least one port for connecting an external peripheral. The system further includes a hand-held computer that embeds control circuitry including at least one controller for the at least one internal peripheral or at least one external peripheral, and an interface for coupling the hand-held computer to the expansion device in a removable manner. In a mobile operating condition in which the hand-held computer is not coupled to the expansion device, the processing circuitry controls the hand-held computer. In an expanded operating condition in which the hand-held computer is coupled to the expansion device, the processing circuitry controls a personal computer formed by the hand-held computer and the expansion device. Also provided are a hand-held computer and an expansion device for use in modular information processing systems.

19 Claims, 2 Drawing Sheets

MODULAR INFORMATION PROCESSING SYSTEM

CROSS-REFERENCE TO RELATED APPLICATIONS

This application is based upon and claims priority from European Patent Application No. 01830581.3, filed Sep. 13, 2001, the entire disclosure of which is herein incorporated by reference.

BACKGROUND OF THE INVENTION

1. Field of the Invention

The present invention relates to the field of information processing systems, and more specifically to a modular information processing system.

2. Description of Related Art

Several types of information processing systems have been proposed by computer manufacturers in recent years. For example, Personal Computers (PCs) are becoming more and more popular since they first appeared in the late 1970s. A personal computer consists of a small, relatively inexpensive single-user system that is based on microprocessor technology. Personal computers are designed for individual use and are commonly employed for running word processors, spreadsheets, and data base applications. Today, personal computers are divided between desktops and notebooks (laptops). Desktops are used at the office or at home and are designed to fit comfortably on top of a desk. Notebooks are portable computers that are extremely lightweight and are small enough to fit easily in a briefcase.

Hand-held computers, also known as palmtops, pocket computers or Personal Digital Assistants (PDAs), have also attained widespread popularity in recent years. A hand-held computer consists of a very small system that literally fits in one hand. Hand-held computers are very practical for certain functions, such as phone books and calendars. Although extremely convenient to carry, hand-held computers have not replaced personal computers because of their limited equipment. Particularly, a hand-held computer has a very small screen and keyboard, which is often replaced with an electronic pen. Moreover, hand-held computers do not include disk drives. Consequently, a user of the hand-held computer usually owns a personal computer as well. This involves frequent exchanges of information between the hand-held computer and the personal computer. In addition, any duplication of information on the two systems requires their synchronization.

A known solution for accomplishing this exchange of information involves using a passive interface, which connects the hand-held computer to the personal computer. The passive interface allows information to be downloaded from the hard-disk of the personal computer to the hand-held computer. Moreover, any updating carried out on the hand-held computer may be replicated on the personal computer. A drawback of the scenario described above is that it involves the proliferation of a large number of different devices, resulting in a negative economic impact on the user. Moreover, the exchange of information between the hand-held computer and the personal computer is time consuming and particularly annoying for the user.

SUMMARY OF THE INVENTION

In view of these drawbacks, it is an object of the present invention to overcome the above-mentioned drawbacks and to provide a modular information processing system.

One embodiment of the present invention provides a modular information processing system. The system includes an expansion device that embeds at least one internal peripheral without a controller and/or at least one port for connecting an external peripheral. The system further includes a hand-held computer that embeds control circuitry including at least one controller for the at least one internal peripheral or at least one external peripheral and processing circuitry coupled to the control circuitry. The system further includes an interface for coupling the hand-held computer to the expansion device in a removable manner. In a mobile operating condition in which the hand-held computer is not coupled to the expansion device, the processing circuitry controls the hand-held computer. In an expanded operating condition in which the hand-held computer is coupled to the expansion device, the processing circuitry controls a personal computer formed by the hand-held computer and the expansion device.

Another embodiment of the present invention provides a hand-held computer for use in a modular information processing system. The hand-held computer includes an interface for coupling the hand-held computer to an expansion device in a removable manner. The hand-held computer further includes embedded control circuitry including a plurality of controllers for at least one internal peripheral and/or at least one port for connecting an external peripheral, the internal peripheral or port being embedded in the expansion device. The hand-held computer further includes processing circuitry coupled to the control circuitry. When in a mobile operating condition in which the hand-held computer is not coupled to the expansion device, the processing circuitry controls the hand-held computer. When in an expanded operating condition in which the hand-held computer is coupled to the expansion device, the processing circuitry controls a personal computer formed by the hand-held computer and the expansion device.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
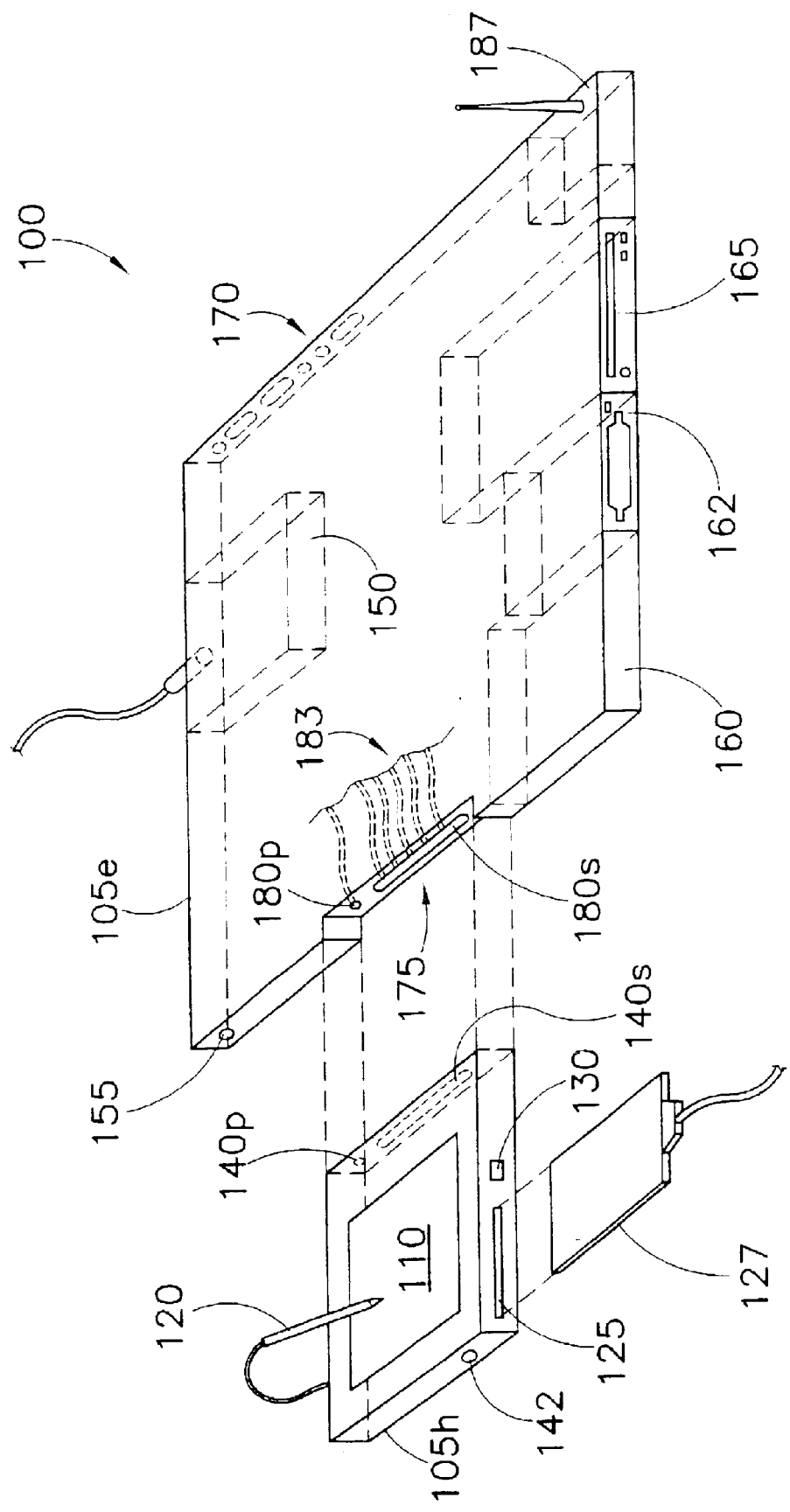
FIG. 1 is a diagram of a modular information processing system in accordance with a preferred embodiment of the present invention.

FIG. 1 shows a modular information processing system in accordance with a preferred embodiment of the present invention. With reference to FIG. 1, a modular information processing system 100 includes a hand-held computer 105$h$ and an expansion device 105$e$. The hand-held computer 105$h$ includes a flat panel screen 110. Typically, the screen 110 is of the active-matrix type and employs a TFT (Thin Film Transistor) technology. An electronic pen (or stylus)

120 is used to input commands and hand-written characters into the hand-held computer 105*h*. A slot 125 conforming to the Personal Computer Memory Card International Association (PCMCIA) standard is provided on the right side of the hand-held computer 105*h*. A PCMCIA modem card 127, consisting of a small, credit card-sized device, is inserted into the slot 125. The modem card 127 is used to connect the hand-held computer 105*h* to a telephone network (for example, through a mobile telephone). A port 130 (conforming to the Infrared Data Association (IrDA) standard, for example) allows exchange of information with other devices via infrared light waves. A female signal connector 140*s* and a female power connector 140*p* are arranged on the rear side of the hand-held computer 105*h*. The hand-held computer 105*h* is turned on and off by activating a switch 142, which is placed on the front side.

The expansion device 105*e* embeds a power supply unit 150, which is plugged into standard electrical outlets. The power supply unit 150 converts alternating current (AC) to direct current (DC), and regulates voltage to eliminate spikes and surges. The expansion device 105*e* is turned on and off by activating a switch 155 placed on the front side. Internal peripheral devices (or integrated peripherals) consisting of a hard-disk 160, a floppy-disk drive 162 and a CD-ROM drive 165 are embedded in the expansion device 105*e*. The internal peripherals 160–165 include the mechanical parts of the devices (such as electric motors, read/write heads, disk-ejecting systems, and the like). However, the internal peripherals 160–165 lack a controller. In other words, the internal peripherals 160–165 do not include electronic circuitry for managing the flow of data to and from the devices.

A series of expansion ports 170 are arranged on the rear side of the expansion device 105*e*. The ports 170 are used to connect external peripherals to the expansion device 105*e*. For example, serial ports are used to connect a keyboard and a mouse, a Cathode Ray Tube (CRT) port is used to connect a monitor, a parallel port is used to connect a printer, a Universal Serial Bus (USB) port is used to connect a scanner, and so on.

A housing 175 for receiving the rear portion of the hand-held computer 105*h* is provided on the front side of the expansion device 105*e*. A male signal connector 180*s* and a male power connector 180*p* (matching the connectors 140*s* and 140*p*, respectively, of the hand-held computer 105*h*) are arranged on the bottom side of the housing 175. A series of flexible cables 183 are plugged into the connectors 180*s* and 180*p*. Particularly, each internal peripheral 160–165 and each port 170 is connected to a distinct section of the signal connector 180*s* through a corresponding cable 183. An additional cable 183 is used to connect the power supply unit 150 to the power connector 180*p*. A transceiver 187 (with an antenna) is further coupled to the signal connector 180*s*. The transceiver 187 (of the Global System for Mobile communications (GSM) type, for example) is used to access the internal peripherals 160–165 and the ports 170 remotely through a telephone connection to the expansion device 105*e*.

Whenever the hand-held computer 105*h* must be coupled to the expansion device 105*e*, its rear portion slips into the housing 175 until the (female) connectors 140*s* and 140*p* plug into the (male) connectors 180*s* and 180*p*. The coupled units operate as a central processing unit of a personal computer (as described in the following). The hand-held computer 105*h* is removed from the expansion device 105*e* by grasping its projecting portion, and then extracting its rear portion from the housing 175.

The configuration of the exemplary modular information processing system described above is meant to be illustrative. Similar considerations apply if the hand-held computer has a different structure (such as a touch-screen, a small keyboard or a voice recognition unit, for example), if the PCMCIA modem and the transceiver are replaced by equivalent remote communications units (such as integrating a transceiver of the mobile telephone in the PCMCIA modem, or exploiting a telephone network of the General Packet Radio Service (GPRS) or Universal Mobile Telecommunications System (UMTS) type), if the expansion device has a different structure (embedding a small keyboard and a flat-panel monitor as in a notebook, for example), if an equivalent structure is proposed for coupling the hand-held computer to the expansion device in a removable manner (exploiting a wireless connection and conforming to the BlueTooth standard, for example), if the expansion device embeds a different number or type of internal peripherals (such as a Digital Versatile Disc (DVD) drive), if different types of ports are proposed (such as a television port), if the internal peripherals and the ports are linked to the signal connector in a different manner, and so on.

Figure 2:
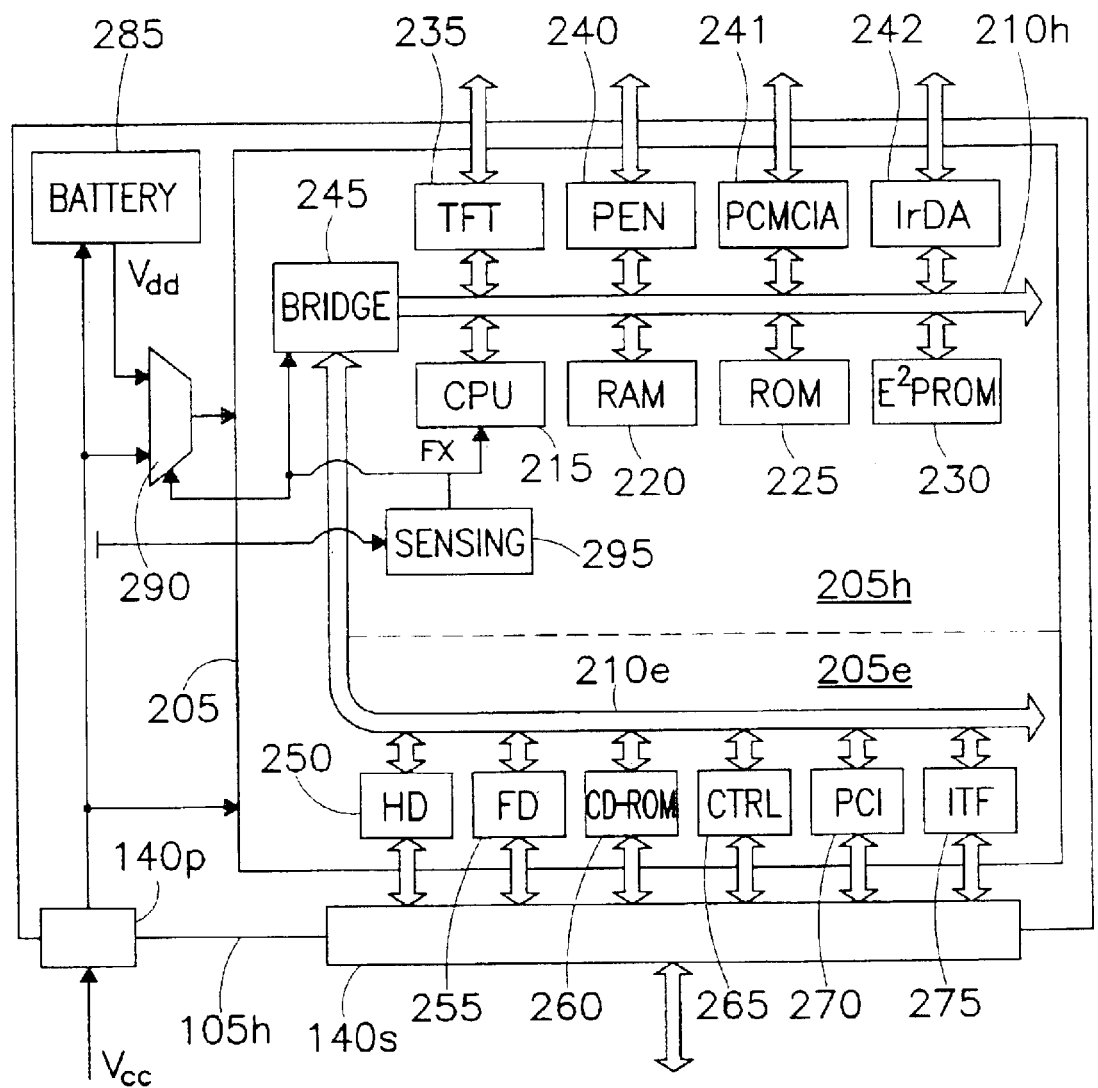
FIG. 2 shows a block diagram of a hand-held computer of the modular information processing system according to one embodiment of the present invention.

FIG. 2 shows a block diagram of an exemplary hand-held computer for the modular information processing system. As shown, the hand-held computer 105*h* embeds a System On Chip (SoC) 205. The system on chip 205 consists of a series of units making up an entire electronic system, which are integrated on a single chip of semiconductor material. The system on chip 205 is partitioned into two sections 205*h* and 205*e*, each of which is supplied independently of the other.

The section 205*h* includes several units that are connected in parallel to a communication bus 210*h*. In detail, a CPU 215 controls operation of the whole system, a RAM 220 is used as a working memory by the CPU 215, and a ROM 225 stores basic code for booting the system. A non-volatile memory 230, typically consisting of a flash EEPROM, operates as a solid-state mass memory for the hand-held computer 105*h*. The section 205*h* further includes a controller 235 for the TFT screen, a controller 240 for the electronic pen, an interface 241 for the PCMCIA slot, and a controller 242 for the infrared port (of the hand-held computer).

A bridge 245 couples the bus 210*h* to an additional communication bus 210*e*, which is formed in the section 205*e*. Further units are connected in parallel to the bus 210*e*. In detail, the section 205*e* includes a controller 250 for the hard-disk, a controller 255 for the floppy-disk drive, and a controller 260 for the CD-ROM drive (of the expansion device). A series of controllers 265 for standard external peripherals commonly employed in the personal computer (such as the monitor, the keyboard and the mouse) are further embedded in the section 205*e*. In addition, the section 205*e* includes a controller 270 for an external bus (of the Peripheral Component Interconnect (PCI) type, for example), which is used to connect further external peripherals to the personal computer (such as the printer and the scanner), and a series of interfaces 275 for the ports of the expansion device. Each one of the units 250–275 interfaces with a corresponding section of the signal connector 140*s*.

The units of the section 205*h* provide all the functionality of the motherboard's chipset of the hand-held computer 105*h*. On the other hand, the units of the section 205*h* together with the units of the section 205*e* provide the functionality of the motherboard's chipset of the personal computer.

The connector 140*p* receives (when the hand-held computer is coupled to the expansion device) an external power supply voltage Vcc, which is derived from an external source connected to the expansion device. The voltage Vcc is used to recharge a battery pack 285, which enables the hand-held computer to run without being plugged in. The battery 285 provides an internal power supply voltage Vdd.

The power supply voltage Vcc is supplied to the section 205e directly. The power supply voltages Vcc and Vdd are input to distinct terminals of a multiplexer 290 (supplied by the voltage Vdd). The multiplexer 290 selectively transmits one of the two power supply voltages, which is supplied to the section 205h. A sensing circuit 295 detects the power supply voltage Vcc and outputs a signal FX indicative of its presence. The signal FX is supplied to the CPU 215, to the bridge 245, and to a control terminal of the multiplexer 290.

When the hand-held computer is not coupled to the expansion device (mobile condition), the section 205e is not supplied so it is disabled. As soon as the hand-held computer is turned on, the battery 285 supplies the multiplexer 290, which transmits the voltage Vdd to the section 205h as a default. The sensing circuit 295 does not detect the power supply voltage Vcc, so that the signal FX is not output. In response thereto, the multiplexer 290 continues to supply the voltage Vdd to the section 205h. Moreover, the bridge 245 is disabled and its logic gates interfacing the bus 210e (of the tri-state type, for example) are set to a high-impedance state. At the same time, the CPU 215 is configured to control operation of the hand-held computer (directing output to the TFT controller 235, receiving input from the pen controller 240, and storing information onto and retrieving information from the flash memory 230, for example). The CPU 215 then starts a boot of the system that involves loading of a complete operating system (for the personal computer), together with software modules specific for operation of the hand-held computer 105h (such as handwriting recognition feature and a power management routine). However, functionalities of the operating system that are not used by the hand-held computer 105h are disabled.

Conversely, when the hand-held computer 105h is coupled to the expansion device (expanded condition), the section 205e is supplied by the voltage Vcc and it is then enabled (upon turning on the expansion device). The sensing circuit 295 detects the power supply voltage Vcc, so that the signal FX is output. In response thereto, the multiplexer 290 transmits the power supply voltage Vcc to the section 205h as well. Moreover, the bridge 245 is enabled to exchange information with the bus 210e and the CPU 215 is configured to control operation of the personal computer (disabling the TFT controller 235 and the pen controller 240, and exchanging information with the units connected to the bus 210e, for example). The CPU 215 then enables the complete operating system and disables the software modules specific for the hand-held computer 105h. In this way, cooperation of the system on chip 205 with the internal and external peripherals of the expansion device provides the complete functionality of a personal computer.

The hand-held computer 105h hows an analogous behaviour when it is not coupled to the expansion device, but it is nevertheless connected to a power supply (not shown in the figure) providing the same voltage Vcc. The section 205h and the section 205e are likewise supplied by the voltage Vcc. Moreover, the bridge 245 is enabled and the CPU 215 is configured to control operation of the personal computer. If the hand-held computer 105h is then remotely coupled to the expansion device through the telephone network (using the modem card inserted into the PCMCIA slot with the respective mobile telephone and the transceiver of the expansion device), in this case also the system on chip 205 may cooperate with the internal and external peripherals of the expansion device providing the complete functionality of a personal computer.

The configuration of the exemplary hand-held computer described above is meant to be illustrative. Similar considerations apply if the hand-held computer has a different architecture, if the system on chip includes analogous processing circuitry and control circuitry (such as interfaces for mass storage devices conforming to the Integrated Drive Electronics (IDE) standard, in which the controller is integrated into the device), if the bridge or the multiplexer are replaced by analogous components, if the logic gates of the bridge are of the open-drive type, if the multiplexer is integrated into the system on chip, and the like. In alternative embodiments, the screen and the electronic pen of the hand-held computer are used even when the hand-held computer is coupled to the expansion device, or two different operating systems are loaded in the mobile and expanded conditions.

More generally, the present invention provides a modular information processing system. The system includes a hand-held computer and an expansion device. An interface is provided for coupling the hand-held computer to the expansion device in a removable manner. The expansion device embeds one or more internal peripherals that are without a controller. In addition or alternatively, the expansion device further embeds one or more ports for external peripherals. The hand-held computer embeds control circuitry including a plurality of controllers for the peripherals and processing circuitry coupled to the control circuitry. In a mobile operating condition in which the hand-held computer is not coupled to the expansion device, the processing circuitry controls operation of the hand-held computer. In an expanded operating condition in which the hand-held computer is coupled to the expansion device, the processing circuitry controls operation of a personal computer having a central processing unit formed by the hand-held computer and the expansion device.

This solution removes the need for a user to own both a hand-held computer and a personal computer at the same time. The present invention provides a modular information processing system of a semi-portable type. The hand-held computer integrates all the electronic circuits that are used by both the hand-held computer and the personal computer. The hand-held computer includes, among other things, the mechanical parts of the internal peripherals used by the personal computer. This feature strongly reduces the system complexity and cost. Further, the expansion device makes it possible to connect both the internal and the external peripherals of the personal computer to the hand-held computer in a very simple manner. Moreover, this architecture allows the functionality of the hand-held computer to be readily expanded by embedding new peripherals, which may use controllers already available in the hand-held computer.

The system of the present invention further avoids any duplication of information on the hand-held computer and the personal computer, since the system may access the information stored on the solid-state mass memory of the hand-held computer directly. Therefore, operation of the whole system is greatly simplified.

The preferred embodiment of the invention described above offers further advantages. For example, the processing circuitry and the control circuitry are integrated in a single chip. This architecture reduces the number of discrete components and consequently the size of the hand-held computer. Moreover, it strongly increases the system reliability. Advantageously, the control circuitry may be selectively disabled. Therefore, the control circuitry does not interfere with the operation of the hand-held computer when it is not necessary (i.e., when the hand-held computer is not coupled to the expansion device).

Preferably, the hand-held computer employs two different power supply voltages, an internal one provided by a battery and an external one received from an outside source. The external power supply voltage supplies both the processing circuitry and the control circuitry when it is available. Otherwise, the processing circuitry is supplied by the internal power supply and the control circuitry is not supplied. This efficiently directs battery power to the different components of the hand-held computer. As a consequence, the lifetime of the battery is greatly increased. Particularly, the external power supply is derived from an external source connected to the expansion device, and it is then provided to the hand-held computer. In this way, the expansion device operates as an active interface for the hand-held computer. The same power supply unit necessary for operation of the internal peripherals is also used for supplying the hand-held computer when it is coupled to the expansion device.

Alternatively, a different system for disabling the control circuitry is used (responsive to the hand-held computer turning on, for example), or the hand-held computer employs a different power supply scheme. For example, the control circuitry may be supplied by the internal power supply as well, in order to allow the hand-held computer to be remotely coupled to the expansion device even without any external power supply. However, the present invention also lends itself to be implemented with the processing circuitry and the control circuitry integrated in two or more chips, and with the control circuitry always enabled.

Preferably, the architecture of both the processing circuitry and the control circuitry is based on a respective communication bus. A bridge is used to connect the two buses to each other. This structure is particularly effective. In addition, any electrical load on the bus of the processing circuitry may be avoided in a very simple manner when the control circuitry is disabled. Moreover, the hand-held computer is preferably coupled to the expansion device through a single connector, which is used to transmit information between the control circuitry and the expansion device. Multiple connectors are then employed for distributing the information to and collecting the information from the peripherals. This feature makes the connection of the hand-held computer to the expansion device and its removal very simple.

In a particular embodiment of the present invention, the hand-held computer may also be remotely coupled to the expansion device. In this way, the user of the hand-held computer is allowed to exploit the functionality of his/her personal computer even when not at the office or at home (of course, with a higher response time for accessing the remote peripherals).

Alternatively, the processing circuitry and/or the control circuitry have a different architecture (with a single bus, for example), the hand-held computer is coupled to the expansion device with two or more connectors, or the hand-held computer may be coupled only locally to the expansion device.

Moreover, it should be noted that either the hand-held computer or the expansion device are suitable to be implemented and put on the market as stand-alone products, which are then combined into the modular information processing system of the present invention.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A modular information processing system comprising:
   an expansion device that embeds at least one internal peripheral without any controller for managing the flow of data to and from the at least one internal peripheral;
   a hand-held computer that embeds control circuitry including at least one controller for managing the flow of data to and from the at least one internal peripheral, and processing circuitry coupled to the control circuitry; and
   an interface for coupling the hand-held computer to the expansion device in a removable manner,
   wherein in a mobile operating condition in which the hand-held computer is not coupled to the expansion device, the processing circuitry controls the hand-held computer, and
   in an expanded operating condition in which the hand-held computer is coupled to the expansion device, the processing circuitry controls a personal computer formed by the hand-held computer and the expansion device.

2. The system of claim 1, wherein the processing circuitry and the control circuitry of the hand-held computer are integrated in a single chip of semiconductor material.

3. The system of claim 1, wherein the hand-held computer further comprises:
   circuitry for selectively disabling the control circuitry.

4. The system of claim 3, wherein the hand-held computer further comprises:
   a battery for providing an internal power supply; and
   an interface for receiving an external power supply,
   wherein when the external power supply is received, the processing circuitry and the control circuitry are supplied by the external power supply, and
   when the external power supply is not received, the processing circuitry is supplied by the internal power supply and the control circuitry is not supplied.

5. The system of claim 4, wherein the expansion device further comprises:
   circuitry for deriving the external power supply from an external source; and
   circuitry for transmitting the external power supply from the expansion device to the hand-held computer when in the expanded operating condition.

6. The system of claim 1, wherein the processing circuitry includes a plurality of first units connected to a first communication bus, the control circuitry includes a plurality of second units connected to a second communication bus, and the hand-held computer further includes a bridge coupled between the first communication bus and the second communication bus.

7. The system of claim 1, wherein the interface comprises:
a single first connector for transmitting information between the control circuitry and the expansion device; and
a plurality of second connectors that each transmit information between the first connector and a corresponding one of the internal peripherals.

8. The system of claim 1, wherein the interface is a remote interface that includes a plurality of remote communication units.

9. A hand-held computer for use in a modular information processing system, the hand-held computer comprising:
an interface for coupling the hand-held computer to an expansion device in a removable manner;
embedded control circuitry including a plurality of controllers for managing the flow of data to and from at least one internal peripheral, the internal peripheral being embedded in the expansion device without any controller for managing the flow of data to and from the internal peripheral; and
processing circuitry coupled to the control circuitry,
wherein in a mobile operating condition in which the hand-held computer is not coupled to the expansion device, the processing circuitry controls the hand-held computer, and
in an expanded operating condition in which the hand-held computer is coupled to the expansion device, the processing circuitry controls a personal computer formed by the hand-held computer and the expansion device.

10. The hand-held computer of claim 9, wherein the processing circuitry and the control circuitry are integrated in a single chip of semiconductor material.

11. The hand-held computer of claim 9, further comprising:
circuitry for selectively disabling the control circuitry.

12. The hand-held computer of claim 11, further comprising:
a battery for providing an internal power supply; and
an interface for receiving an external power supply,
wherein when the external power supply is received, the processing circuitry and the control circuitry are supplied by the external power supply, and
when the external power supply is not received, the processing circuitry is supplied by the internal power supply and the control circuitry is not supplied.

13. The hand-held computer of claim 9, wherein the processing circuitry includes a plurality of first units connected to a first communication bus, the control circuitry includes a plurality of second units connected to a second communication bus, and the hand-held computer further includes a bridge coupled between the first communication bus and the second communication bus.

14. The hand-held computer of claim 9, wherein the interface comprises:
a single connector for transmitting information between the control circuitry and the expansion device.

15. The hand-held computer of claim 9, wherein the interface is a remote interface that includes a remote communication unit.

16. An expansion device for use in a modular information processing system, the expansion device comprising:
at least one internal peripheral without any controller for managing the flow of data to and from the at least one internal peripheral; and
an interface for coupling the expansion device to a hand-held computer in a removable manner, at least one controller for managing the flow of data to and from the at least one internal peripheral being embedded in the hand-held computer.
wherein in an expanded operating condition in which the hand-held computer is coupled to the expansion device, the processing circuitry of the hand-held computer controls a personal computer formed by the hand-held computer and the expansion device.

17. The expansion device of claim 16, further comprising:
circuitry for deriving the external power supply from an external source; and
circuitry for transmitting the external power supply from the expansion device to the hand-held computer when in the expanded operating condition.

18. The expansion device of claim 16, wherein the interface comprises:
a plurality of second connectors that each transmit information received from the hand-held computer to a corresponding one of the internal peripherals.

19. The expansion device of claim 16, wherein the interface is a remote interface that includes a remote communication unit.

* * * * *